S. A. ADDIS.
DISPENSING BOWL.
APPLICATION FILED JAN. 31, 1913.
1,087,860.
Patented Feb. 17, 1914.
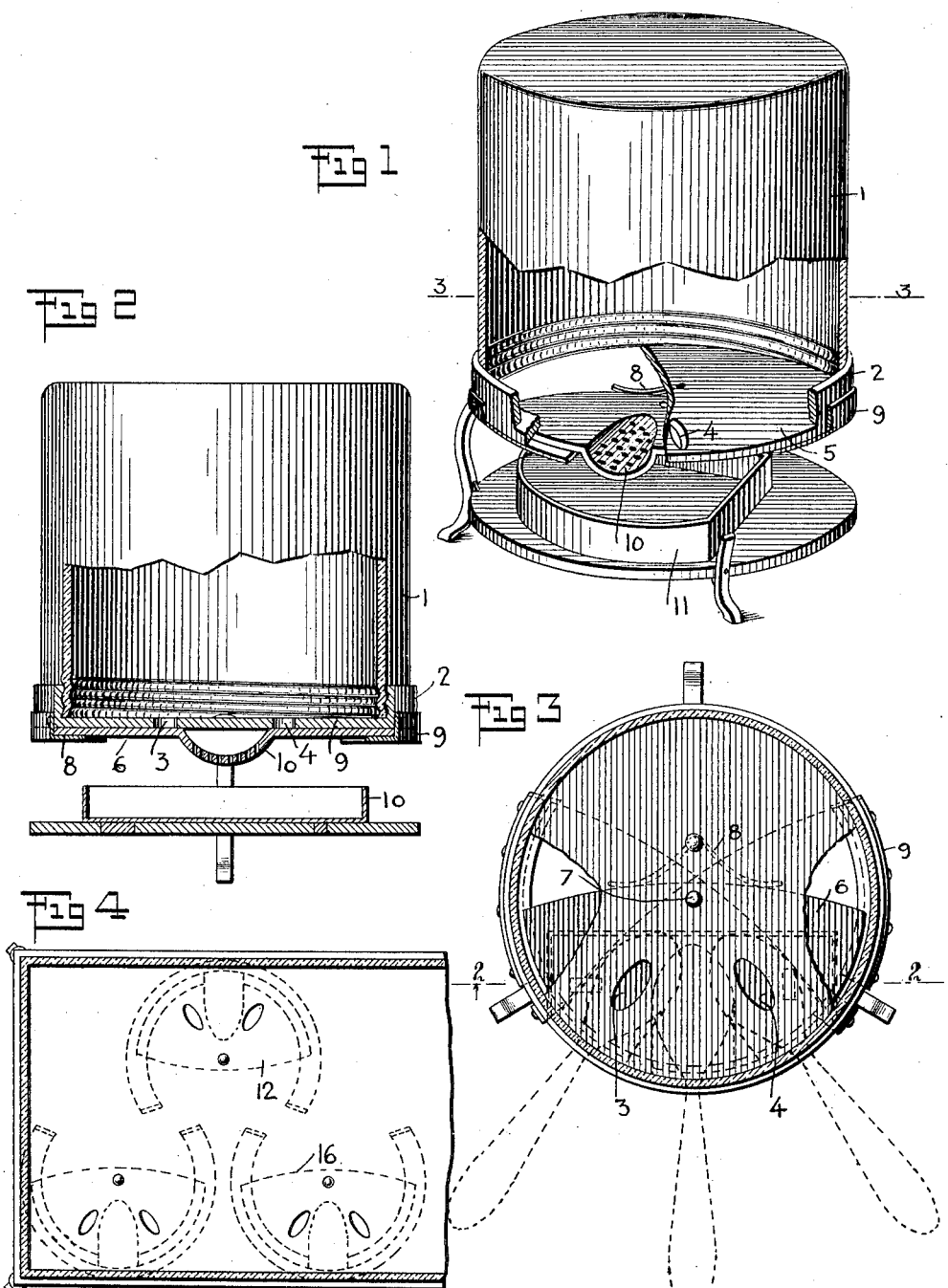
WITNESSES
C. J. Hachenburg
A. L. Kitchin
INVENTOR
Samuel A. Addis
BY Munn&Co
ATTORNEYS

UNITED STATES PATENT OFFICE.

SAMUEL A. ADDIS, OF NEW YORK, N. Y.

DISPENSING-BOWL.

1,087,860.

Specification of Letters Patent. Patented Feb. 17, 1914.

Application filed January 31, 1913. Serial No. 745,424.

*To all whom it may concern:*

Be it known that I, SAMUEL A. ADDIS, a citizen of the United States, and a resident of the city of New York, borough of Bronx, in the county of Bronx and State of New York, have invented a new and Improved Dispensing-Bowl, of which the following is a full, clear, and exact description.

This invention relates to improvements in dispensing bowls, particularly to an improved bowl for dispensing sugar and other similar material, and has for an object to provide an improved structure which will allow the dispensing of measured quantities of sugar, and will prevent any wasting thereof.

A further object of the invention is to provide a dispensing bowl with one or more discharge slots, and a swinging closure therefor formed with means for receiving a receptacle, as for instance a spoon, the swinging closure being adapted to be actuated by the spoon so as to be brought beneath the discharge aperture or moved therefrom.

In carrying out the objects of the invention, a bowl of any desired kind is provided, having a base, and supporting means associated with the base. Connected with the base or the supporting means, as desired, is a receptacle for catching the sugar or other material which may be spilled. Arranged in the base is a discharge opening or, if desired, a plurality of discharge openings may be arranged in the base, these discharge openings being normally closed by a swinging closure formed with a perforated depression. This perforated depression is adapted to receive a spoon, which in turn is adapted to swing the closure so that the spoon may be brought beneath the discharge opening for being filled. When the spoon is withdrawn, the closure swings back to a normally central position for closing the discharge opening. In this way the sugar or other material being dispensed may be removed in measured quantities in a sanitary manner and without the loss of any part thereof, the part which is not discharged into the spoon being received by a suitable receptacle arranged beneath the swinging closure.

A practical embodiment of the invention is represented in the accompanying drawings forming a part of this specification in which similar characters of reference indicate corresponding parts in all the views.

Figure 1 is a perspective view of a bowl with certain parts broken away, the same disclosing an embodiment of the invention; Fig. 2 is a section through Fig. 3, approximately on the line 2—2, part being shown in elevation; Fig. 3 is a section through Fig. 1 approximately on the line 3—3; and Fig. 4 is a longitudinal horizontal section through a slightly modified form of the invention.

Referring to the accompanying drawings by numerals, 1 indicates a bowl of any desired kind, as for instance glass, which may be threaded and screwed into a base 2 for connecting the base and the bowl together. The base 2 may be made of any desired material, as for instance metal, and provided with a pair of apertures 3 and 4 through which the sugar or other material in the bowl 3 may be discharged. Pivotally connected to the bottom 5 of the base 2 is a closure member 6, held in place by a suitable pivotal member 7, the pivotal member being of any desired structure, as for instance a rivet or bolt. In order to normally hold member 6 properly in position, as shown in Fig. 3, a spring 8 is connected with the bottom 5 and arranged to continually press against the opposite edges of the closure 6, as shown in Fig. 3, so as to normally hold the closure in the position shown in Fig. 3, and return the same to that position when moved therefrom. A track or guiding member 9 is connected with base 2 by rivets or in any desired manner, which supports the outer edge of the closure 6 as more clearly shown in Figs. 1 and 2. Arranged at any convenient point, preferably centrally of the closure 6, is a depressed portion 10 formed with apertures therein so that when the sugar is being dispensed and the same fails to enter the spoon, the sugar will pass downwardly into a suitable receptacle 11 supported in any desired manner. It will be understood that the depression 10 could be arranged to receive any other desired receptacle as well as a spoon, so that when the term spoon is used in this specification it means a spoon *per se* or any other receptacle.

In arranging the apertures 3 and 4, and the pivoting of the closure 6, it will be observed from Fig. 3 that the spoon may be swung in either direction and be moved beneath the discharge opening. It will also be noted from the modified form of structure shown in Fig. 4 that a plurality of discharge openings may be provided with closures 12 formed similar to closure 6, so that sugar may be discharged from either side of the receptacle and at as many points as desired along any one side. It is, of course, to be understood that the receptacle 1 could be made round, oblong, square, or in any other shape, without departing from the spirit of the invention.

Having thus described my invention, I claim as new and desire to secure by Letters Patent:—

1. In a dispensing bowl of the character described, a bowl structure, a base therefor formed with an aperture therein, a pivotally mounted or swinging closure for said aperture formed with a depression for receiving a receptacle, and means for guiding said closure in its swinging movement, said closure being adapted to be swung so that said receptacle receiving portion will be beneath said aperture when it is desired to discharge matter from said bowl.

2. In a dispensing sugar bowl of the class described, a bowl structure, a base connected therewith formed with a plurality of apertures therein, a swinging plate arranged on the bottom of said base formed with a perforated central depression, a resilient member for normally holding said depression in the space between said apertures and moving the same back to that position when moved therefrom, means for guiding said plate in its back and forth movement, and a receptacle for receiving sugar passing through said perforated depression.

In testimony whereof I have signed my name to this specification in the presence of two subscribing witnesses.

SAMUEL A. ADDIS.

Witnesses:
ALFRED H. DAVIS,
PHILIP D. ROLLHAUS.

---

Copies of this patent may be obtained for five cents each, by addressing the "Commissioner of Patents, Washington, D. C."